US010089313B2

(12) United States Patent
Romano et al.

(10) Patent No.: US 10,089,313 B2
(45) Date of Patent: Oct. 2, 2018

(54) CONVERSION OF DATA INTEGRATION SYSTEM FILES

(71) Applicant: Bank of America Corporation, Charlotte, NC (US)

(72) Inventors: Brad E. Romano, Furlong, PA (US); John Abraham, Belle Mead, NJ (US)

(73) Assignee: Bank of America Corporation, Charlotte, NC (US)

( * ) Notice: Subject to any disclaimer, the term of this patent is extended or adjusted under 35 U.S.C. 154(b) by 288 days.

(21) Appl. No.: 14/626,271

(22) Filed: Feb. 19, 2015

(65) Prior Publication Data

US 2016/0246809 A1 Aug. 25, 2016

(51) Int. Cl.
G06F 17/30 (2006.01)

(52) U.S. Cl.
CPC .. G06F 17/30079 (2013.01); G06F 17/30563 (2013.01)

(58) Field of Classification Search
CPC ............. G06F 17/30079; G06F 17/30563
USPC .......................................... 707/756
See application file for complete search history.

(56) References Cited

U.S. PATENT DOCUMENTS

| | | | |
|---|---|---|---|
| 9,747,284 B2 * | 8/2017 | Marciano | G06F 17/289 |
| 2004/0205716 A1 * | 10/2004 | Abdel-Rahman | G06F 8/71 |
| | | | 717/120 |
| 2005/0251533 A1 | 11/2005 | Harken et al. | |
| 2011/0093514 A1 * | 4/2011 | Brown | G06F 17/30557 |
| | | | 707/810 |
| 2012/0143378 A1 * | 6/2012 | Spears | H04L 12/282 |
| | | | 700/275 |
| 2012/0265726 A1 | 10/2012 | Padmanabhan et al. | |
| 2012/0296862 A1 | 11/2012 | Duda et al. | |
| 2013/0262080 A1 * | 10/2013 | Marciano | G06F 17/2836 |
| | | | 704/3 |
| 2013/0275363 A1 * | 10/2013 | Wu | G06F 9/46 |
| | | | 707/602 |
| 2014/0279830 A1 * | 9/2014 | Majumdar | G06F 17/30563 |
| | | | 707/602 |

(Continued)

OTHER PUBLICATIONS

Article, ETL Converter, SourceForge.net: ETL Converter—Project Web Housing—Open Source Software, http://etlconverter.sourceforge.net/ downloaded Mar. 9, 2015 (three pages).

(Continued)

*Primary Examiner* — Hung T Vy
(74) *Attorney, Agent, or Firm* — Baker Botts L.L.P.

(57) ABSTRACT

According to one embodiment, a system for converting data integration system ("DIS") files comprises a memory operable to store data associated with at least one DIS and a processor communicatively coupled to the memory and operable to convert files associated with a first DIS to files associated with a second DIS. The operating system used by the first DIS is different from the operating system used by the second DIS. The processor converts the files by being operable to determine differences between the first DIS and the second DIS, determine a set of transformation rules based on the differences, create a conversion algorithm based on the set of transformation rules, and execute the conversion algorithm to convert the files. The system is further operable to execute the second DIS such that the second DIS uses the converted data integration files.

20 Claims, 3 Drawing Sheets

(56) References Cited

U.S. PATENT DOCUMENTS

Figure 1:
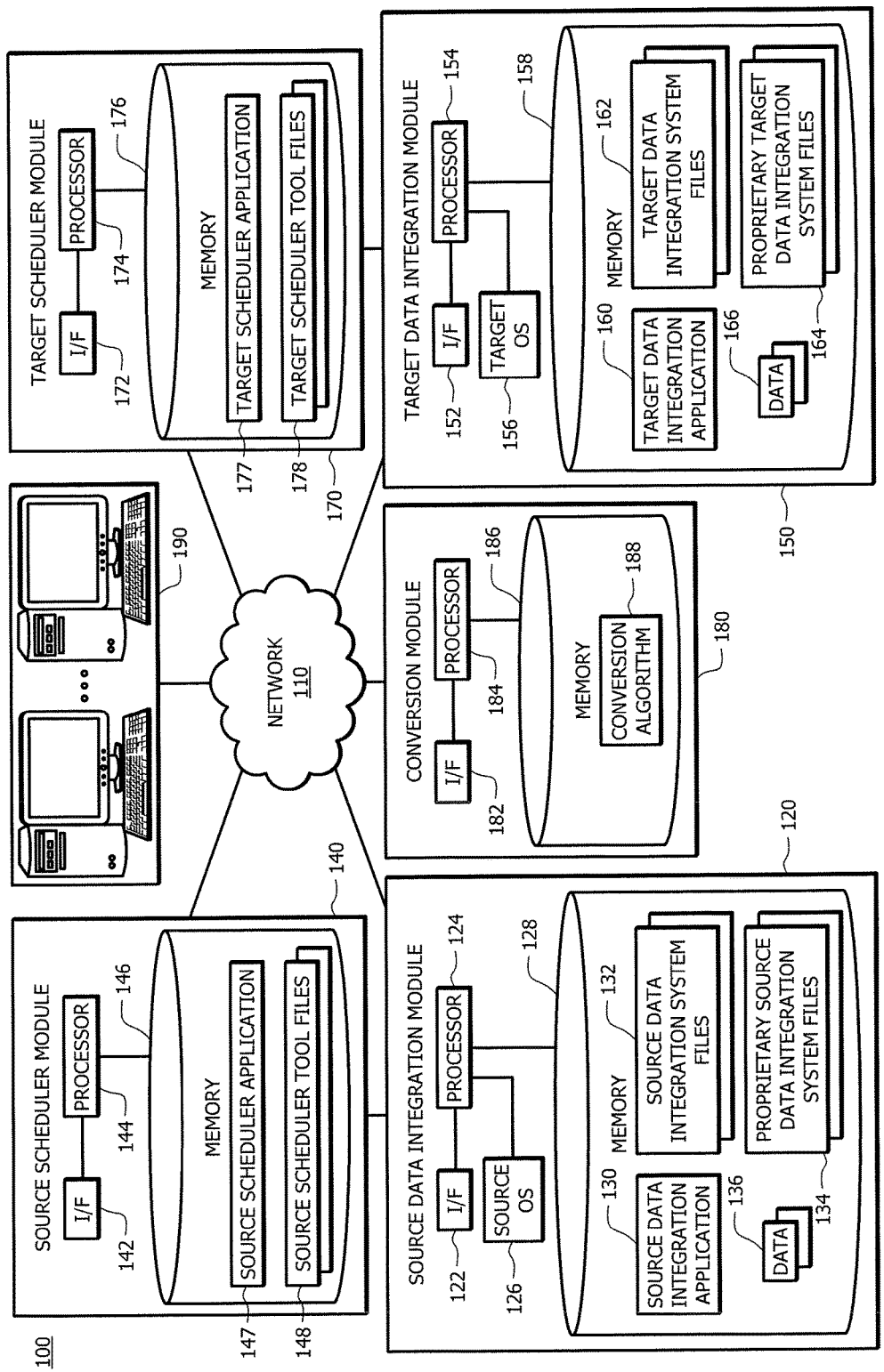

2015/0220541 A1\* 8/2015 Parameswaran .............................
G06F 17/30179
707/694

OTHER PUBLICATIONS

Article, AnalytiX DS Litespeed Conversiion—An ETL Migration, LiteSpeed Conversion/ ETL Conversion Tools/ETL Platform Conversion/AnalytiX DS, http://analytixds.com/litespeed-conversion/ downloaded Mar. 9, 2015 (nine pages).

\* cited by examiner

CONVERSION OF DATA INTEGRATION SYSTEM FILES

TECHNICAL FIELD

This disclosure relates generally to data integration systems, and more particularly to converting files between data integration systems, including when data integration systems execute or use different operating systems.

BACKGROUND

Data integration refers to the combination of data from one or more sources into a homogenous environment at a target destination. For example, a financial institution may combine data about financial transactions from multiple sources into a data warehouse. Extract, transform, and load (ETL) refers to a process that extracts data from one or more sources, transforms it to fit operational needs of an organization, and loads it into an end target, such as a database or data warehouse. Data integration systems, such as ETL systems, may process multiple terabytes of data using multiple servers with multiple processing units. Data integration systems may also comprise or associate with scheduler tools, which may manage some or all of the functions of a data integration system. For example, scheduler tools may provide workload automation. Data integration systems may also use and/or comprise files associated with the data integration system that assist with the function of the data integration system and/or comprise some or all of the data being integrated. These data integration system files may be transferred, or migrated, from one set of servers and processing units to another. For example, a financial institution may have upgraded its servers and wish to transfer data integration system files from its existing servers to its upgraded servers. In certain situations, existing servers and upgraded servers may execute or use different operating systems.

SUMMARY OF EXAMPLE EMBODIMENTS

In accordance with the present disclosure, disadvantages and problems associated with converting data between data integration systems when the data integration systems execute or use different operating systems may be reduced or eliminated According to particular embodiments of the present disclosure, a system comprises a memory and a processor. The memory is operable to store data associated with at least one data integration systems. The processor is communicatively coupled to the memory and the processor is operable to identify a first data integration system that uses a first operating system and identify a second data integration system that that uses a second operating system. The first operating system is different than the second operating system. The processor is further operable to determine a plurality of differences between the first data integration system and the second data integration system. A set of transformation rules are determined, based at least in part on at least one of the plurality of differences. Once it determines a set of transformation rules, the processor is operable to create a conversion algorithm, based at least in part on the set of transformation rules. The processor is also operable to execute the conversion algorithm to convert a file associated with the first data integration system to a file associated with the second data integration system. The processor is further operable to execute the second data integration system, wherein the second data integration system uses the second at least one file.

Certain embodiments of the present disclosure may provide one or more technical advantages. For example, converting files between different data integration systems may be difficult, costly, and time consuming. The difficulty, cost, and time required may increase greatly if the different data integration systems execute or use different operating systems. When the operating systems are different, even files associated with the same data integration system application, for example, DataStage, may not be usable between both data integration systems without conversion. Thus, creating a reliable way to convert between data integration systems executing or using different operating systems increases the flexibility that an organization has vis-à-vis its data integration systems. For example, if an organization obtains new servers that execute or use a different operating system than the current or old servers, being able to convert data integration files between the two sets of servers allows the organization to more readily and inexpensively upgrade its data integration systems.

As another example advantage, compared to trying to convert each data integration application file one-by-one, a system and/or a conversion algorithm that accounts for some or all of the differences between data integration systems that execute or use different operating systems may be superior for several reasons. As one example, a system and/or conversion algorithm may be able to convert data integration system files significantly more quickly than through a one-by-one approach. As a second example, by understanding the differences between data integration systems, a conversion algorithm may be created that is able to automatically bulk-convert some or all files between the data integration systems in one short period of time. Automatic bulk-converting thus saves organizations effort, money, and time. In addition, a conversion algorithm may allow for repeat conversions with little or no analysis needed beyond creating the initial conversion algorithm.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE EXAMPLE DRAWINGS

Figure 2:
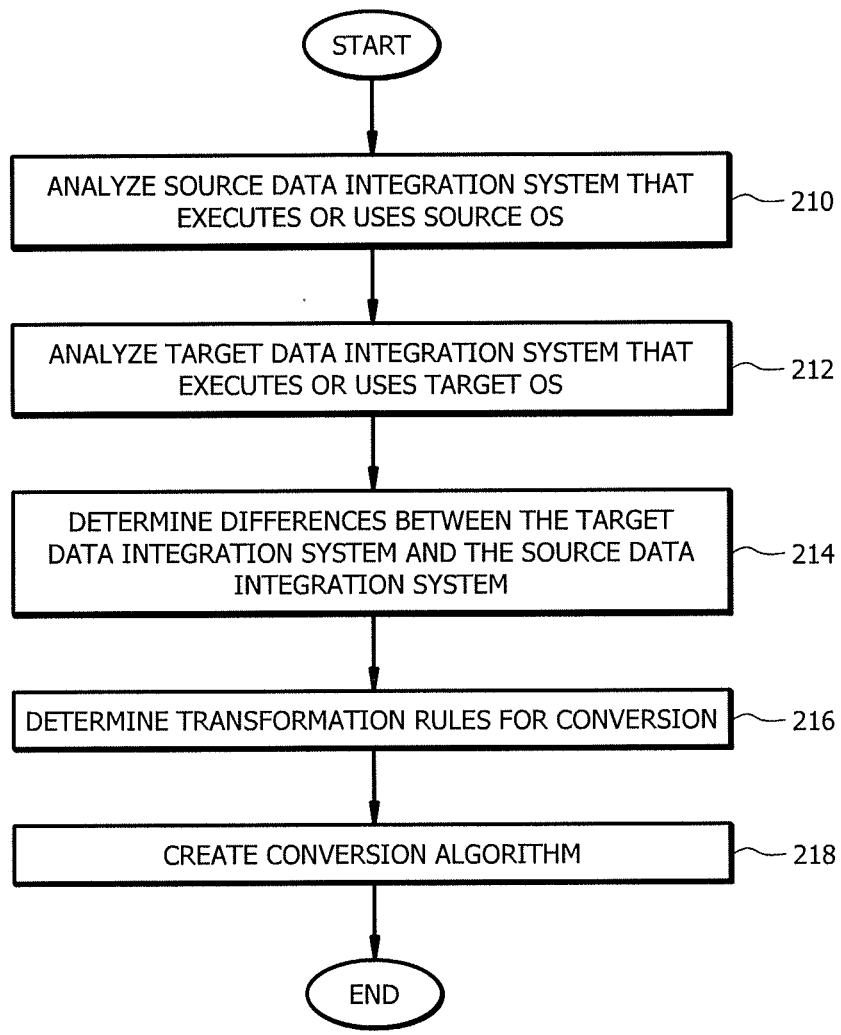
Figure 3:
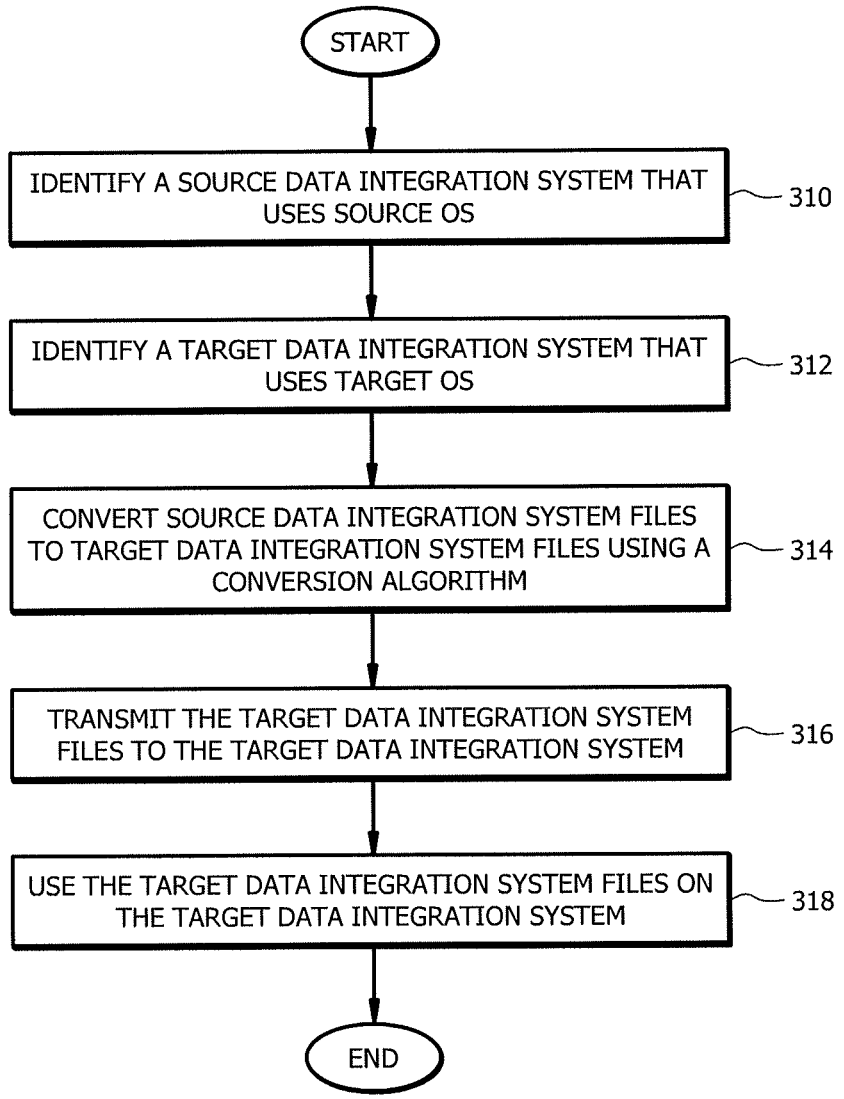

For a more complete understanding of the present disclosure and for further features and advantages thereof, reference is now made to the following description taken in conjunction with the accompanying example drawings, in which:

FIG. 1 illustrates a block diagram of an example data integration system conversion system, according to a particular embodiment;

FIG. 2 illustrates a flowchart of an example method of creating a conversion algorithm, which may be used, for example, in the system illustrated in FIG. 1 and/or in the method illustrated in FIG. 3, according to a particular embodiment; and FIG. 3 illustrates a flowchart of an example method of converting data, such as data integration system files, between data integration systems executing or using different operating systems, which may be used, for example, in the system illustrated in FIG. 1, according to a particular embodiment.

DETAILED DESCRIPTION

Embodiments of the present disclosure and its advantages are best understood by referring to FIGS. 1-3, like numerals being used for like and corresponding parts of the various drawings.

Data integration refers to the combination of data from one or more sources into a homogenous environment at a target destination. For example, a financial institution may combine data about financial transactions from multiple sources into a data warehouse. Extract, transform, and load (ETL) refers to a process that extracts data from one or more sources, transforms it to fit operational needs of an organization, and loads it into an end target, such as a database or data warehouse. Data integration systems, such as ETL systems, may process multiple terabytes of data using multiple servers with multiple processing units. Data integration systems may also comprise or associate with scheduler tools, which may manage some or all of the functions of a data integration system. For example, scheduler tools may provide workload automation. Data integration systems may also use and/or comprise files associated with the data integration system that assist with the function of the data integration system and/or comprise some or all of the data being integrated. These data integration system files may be transferred, or migrated, from one set of servers and processing units to another. For example, a financial institution may have upgraded its servers and wish to transfer data integration system files from its existing servers to its upgraded servers. In certain situations, existing servers and upgraded servers may execute or use different operating systems.

A particular data integration system may also execute or use a particular operating system, such as on servers that may execute or use a particular operating system. Put another way, a data integration system, including associated data integration system files, may be adapted to function in a particular operating system environment. As a result, files associated with a particular data integration system executing or using a particular operating system may not function properly or fully once transferred to a data integration system executing or using a different operating system. Thus, to ensure that data integration system files function properly once transferred from one operating system environment to another, such data integration system files may first require conversion. This system may be used in any suitable enterprise to facilitate data integration.

FIG. 1 illustrates a block diagram of an example system 100 that converts data integration systems (DIS) according to a particular embodiment. System 100 may include a source data integration module 120, a source scheduler module 140, a target data integration module 150, a target scheduler module 170, a conversion module 180, computers 190, and a network 110. Network 110 may communicably couple source data integration module 120, source scheduler module 140, target data integration module 150, target scheduler module 170, conversion module 180, computers 190, and/or any components contained within or controlled by such modules or computers.

Network 110 represents any suitable network operable to facilitate communication between the components of system 100, such as source data integration module 120, source scheduler module 140, computers 190, target data integration module 150, target scheduler module 170, conversion module 180, and/or any components contained within or controlled by such modules or computers. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In general, source data integration module 120 may coordinate the processing of data integration jobs. Data integration jobs may include batch processing of data from one or more input sources, such as a customer transaction database, into a target destination, such as a data warehouse. In particular embodiments, data integration jobs may include extract, transform, and load (ETL) jobs. In particular embodiments, source data integration module 120 may be characterized as, and/or may comprise, a source data integration system (DIS). In particular embodiments, source data integration module 120 may comprise a DIS that coordinates and/or processes ETL jobs.

Source data integration module 120 may refer to any suitable combination of hardware and/or software implemented in one or more modules to process data and provide the described functions and operations. In particular embodiments, source data integration module 120 and/or any components thereof may include a network server, any suitable remote server, a mainframe, a host computer, a workstation, a web server, a personal computer, a file server, or any other suitable device operable to communicate with other components in system 100 and process data. In particular embodiments, the functions of source data integration module 120 may be performed by any suitable combination of one or more servers or other components at one or more locations. In embodiments where the module is a server, the server may be a private server, and the server may be a virtual or physical server. In the illustrated embodiment, source data integration module 120 comprises interface (I/F) 122, processor 124, source operating system (OS) 126, and memory 128, wherein memory 128 stores source data integration application 130, source DIS files 132, proprietary source DIS files 134, and/or data 136.

Source data integration module 120 may comprise interface 122. In general, interface 122 communicates data for the processing of data integration jobs and other functions of source data integration module 120 among the other elements of system 100. In some embodiments, interface 122 is communicably coupled to processor 124 and may refer to any suitable device operable to receive input for source data integration module 120, send output from source data integration module 120, perform suitable processing of the input or output or both, communicate to other devices, or any combination of the preceding. Interface 122 may include appropriate hardware (e.g., modem, network interface card, etc.) and software, including protocol conversion and data processing capabilities, to communicate through network 110 or other communication system that allows source data integration module 120 to communicate to other components of system 100. Interface 122 may include any suitable software operable to access data from various devices such as source data integration module 120, source scheduler module 140, target data integration module 150, target scheduler module 170, conversion module 180, and/or computers 190. Interface 122 may include any suitable software operable to transmit data to various devices such as source data integration module 120, source scheduler module 140, target data integration module 150, target scheduler module 170, conversion module 180, and/or computers 190. Interface 122 may include one or more ports, conversion software, or both.

Source data integration module 120, and/or some or all of the components of source data integration module 120, may execute or use source operating system 126. In particular embodiments, source data integration module 120, and/or some or all of the components therein, may execute or use some operating systems but not others. In particular embodiments, certain features or functions of source data integration module 120 may execute or use some operating systems but not others. In particular embodiments, source operating system 126 may comprise Solaris, AIX, HP-UX, Linux, UNIX, MS-DOS, PC-DOS, MAC-OS, i-OS, WINDOWS, OpenVMS, z/VSE, IBM's zSeries/Operating System (z/OS), Virtual Server Environment, a .NET environment, or any other appropriate operating system, including future operating systems. In particular embodiments, source operating system 126 may comprise and/or execute or use a version of the WINDOWS operating system.

Source data integration module 120 may comprise processor 124. Processor 124 is generally operable to coordinate and/or process data integration jobs. In particular embodiments, processor 124 may be operable to execute source data integration application 130 and process source DIS files 132, proprietary source DIS files 134 and data 136. Processor 124 may be communicably coupled to interface 122 and/or memory 128. Processor 124 may comprise any suitable combination of hardware and software to execute instructions and manipulate data to perform the described functions for source data integration module 120. In some embodiments, processor 124 may include, for example, one or more computers, one or more central processing units (CPUs), one or more microprocessors, one or more applications, and/or other logic.

Source data integration module 120 may comprise memory 128. In general, memory 128 stores data, including files, applications, and other data, associated with source data integration module 120. Examples of memory 128 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or or any other volatile or non-volatile, non-transitory computer-readable memory devices that store one or more files, lists, tables, or other arrangements of information. In particular embodiments, memory 128 may store source data integration application 130, source DIS files 132, proprietary source DIS files 134, and/or data 136. In particular embodiments, memory 128 may store source operating system 126.

Source data integration module 120 may comprise source data integration application 130. Source data integration application 130 generally refers to logic, rules, algorithms, code, tables, and/or other suitable instructions for executing any suitable functions regarding the operation of source data integration module 120. In particular embodiments, source data integration application 130 may execute data integration jobs associated with source data integration module 120. In particular embodiments, source data integration application 130 may comprise a version of IBM's DataStage and/or similar data integration applications.

Source data integration module 120 may comprise source DIS files 132. In general, source DIS files 132 are files that may assist with any function or operation of source data integration module 120, or any component thereof. In particular embodiments, source DIS files 132 may be specific to the operation of source data integration module 120. In particular embodiments, source DIS files 132 may be specific to the operation of source data integration application 130. In particular embodiments, source DIS files 132 may comprise .dsx, .bat, and/or other types of files associated with the operation of DataStage. Other types of files suitable for use with source data integration module 120 may be used as source DIS files 132.

In addition, source data integration module 120 may comprise proprietary source DIS files 134. In general, proprietary source DIS files 134 are proprietary files used by source data integration module 120, or any component thereof, that may assist with any function or operation of source data integration module 120. In particular embodiments, proprietary source DIS files 134 may be specific to the operation of source data integration module 120. Proprietary source DIS files 134 may be customized, modified, and/or non-standard files created by or for a particular user (e.g., a specific organization) for use by source data integration module 120. In particular embodiments, proprietary source DIS files 134 may be specific to the operation of source data integration application 130. In particular embodiments, proprietary source DIS files 134 may comprise .ini and/or other types of files associated with the operation of DataStage. Other types of files suitable for use with source data integration module 120 may be used as proprietary source DIS files 134.

Source data integration module 120 may also contain data 136. Data 136 may comprise any data useful to support the function or operation of source data integration module 120. In particular embodiments, data 136 may comprise data integration jobs and/or data associated with data integration jobs. In particular embodiments, data 136 may comprise a data warehouse and/or any number of databases. In particular embodiments, data 136 may comprise files that assist with the function of source data integration module 120. Data 136, as well as any other data associated with source data integration module 120, including source DIS files 132 and proprietary source DIS files 134, may be stored on any suitable device capable of storing and facilitating retrieval of such data, for example, memory 128.

In general, source scheduler module 140 may manage some or all of the functions of source data integration module 120 or any of its components. In particular embodiments, source scheduler module 140 may provide workload automation. In particular embodiments, source scheduler module 140 may provide event-driven automation, policy-based management, and/or workflow monitoring and reporting capabilities. In particular embodiments, source scheduler module 140 may operate as a scheduler of ETL jobs and/or other data integration jobs. In particular embodiments, source scheduler module 140 may be characterized as, and/or may comprise, a source scheduler tool. In particular embodiments, source scheduler module 140 may comprise a source scheduler tool that manages ETL jobs. In particular embodiments, a source scheduler tool may be part of or associated with a data integration system, such as a source data integration system comprising source data integration module 120.

Source scheduler module 140 may refer to any suitable combination of hardware and/or software implemented in one or more modules to process data and provide the described functions and operations. In particular embodiments, source scheduler module 140 and/or any components thereof may include a network server, any suitable remote server, a mainframe, a host computer, a workstation, a web server, a personal computer, a file server, or any other suitable device operable to communicate with other components in system 100 and process data. In particular embodiments, the functions of source scheduler module 140 may be performed by any suitable combination of one or more servers or other components at one or more locations. In embodiments where the module is a server, the server may be a private server, and the server may be a virtual or physical server. In the illustrated embodiment, source scheduler module 140 comprises interface (I/F) 142, processor 144, and memory 146, wherein memory 146 stores source scheduler application 147 and source scheduler tool files 148.

In addition, source scheduler module 140, and/or some or all of the components therein, may execute or use an operating system. In particular embodiments, source scheduler module 140, and/or some or all of the components therein, may execute or use some operating systems but not others. In particular embodiments, certain features or functions of source scheduler module 140 may execute or use some operating systems but not others. In particular embodiments, source scheduler module 140 may execute or use the same operating system used by source data integration module 140, such as source operating system 126. In particular embodiments, source scheduler module 140 may execute or use, or be used with servers, databases, and/or other components that execute or use, Solaris, AIX, HP-UX, Linux, UNIX, MS-DOS, PC-DOS, MAC-OS, i-OS, WINDOWS, OpenVMS, z/VSE, IBM's zSeries/Operating System (z/OS), Virtual Server Environment, a .NET environment, or any other appropriate operating system, including future operating systems. In particular embodiments, source scheduler module 140 may execute or use a version of the WINDOWS operating system.

Source scheduler module 140 may comprise interface (I/F) 142. In general, interface 142 communicates data for the management of data integration jobs and other functions of source scheduler module 140 among the other elements of system 100. In some embodiments, interface 142 is communicably coupled to processor 144 and may refer to any suitable device operable to receive input for source scheduler module 140, send output from source scheduler module 140, perform suitable processing of the input or output or both, communicate to other devices, or any combination of the preceding. Interface 142 may include appropriate hardware (e.g., modem, network interface card, etc.) and software, including protocol conversion and data processing capabilities, to communicate through network 110 or other communication system that allows source scheduler module 140 to communicate to other components of system 100. Interface 142 may include any suitable software operable to access data from various devices such as source data integration module 120, source scheduler module 140, target data integration module 150, target scheduler module 170, conversion module 180, and/or computers 190. Interface 142 may include any suitable software operable to transmit data to various devices such as source data integration module 120, source scheduler module 140, target data integration module 150, target scheduler module 170, conversion module 180, and/or computers 190. Interface 142 may include one or more ports, conversion software, or both.

Source scheduler module 140 may comprise processor 144. Processor 144 is generally operable to manage data integration jobs. In particular embodiments, processor 144 may be operable to execute source scheduler application 147 and process source scheduler tool files 148. Processor 144 may be communicably coupled to interface 142 and/or memory 146. Processor 144 may comprise any suitable combination of hardware and software to execute instructions and manipulate data to perform the described functions for source scheduler module 140. In some embodiments, processor 144 may include, for example, one or more computers, one or more central processing units (CPUs), one or more microprocessors, one or more applications, and/or other logic.

Source scheduler module 140 may comprise memory 146. In general, memory 146 stores data, including files, applications, and other data, associated with source scheduler module 140. Examples of memory 146 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or or any other volatile or non-volatile, non-transitory computer-readable memory devices that store one or more files, lists, tables, or other arrangements of information. In particular embodiments, memory 146 may store source scheduler application 147 and source scheduler tool files 148. In particular embodiments, memory 146 may store an operating system.

Source scheduler module 140 may comprise source scheduler application 147. Source scheduler application 147 generally refers to logic, rules, algorithms, code, tables, and/or other suitable instructions for executing any suitable functions regarding the operation of source scheduler module 140. In particular embodiments, source scheduler application 147 may execute data integration job management functions associated with source scheduler module 140. In particular embodiments, source scheduler application 147 may comprise a version of CA's AutoSys, CA's AutoSys Workload Automation, and/or similar scheduler applications. In particular embodiments, source scheduler application 147 may include mechanisms, such as a job instruction language (JIL), for scheduling ETL jobs and/or other data integration jobs.

Source data integration module 120 may comprise source scheduler tool files 148. In general, source scheduler tool files 148 are files that may assist with any function or operation of source scheduler module 140, or any component thereof. In particular embodiments, source scheduler tool files 148 may be specific to the operation of source scheduler module 140. In particular embodiments, source scheduler tool files 148 may be specific to the operation of source scheduler application 147. In particular embodiments, source scheduler tool files 148 may comprise .jil and/or other types of files associated with the operation of AutoSys, AutoSys Workload Automation, and/or DataStage. Other types of files suitable for use with source scheduler module 140 may be used as source scheduler tool files 148. In particular embodiments, source scheduler tool files 148 may be proprietary.

In general, target data integration module 150 may coordinate the processing of data integration jobs. Data integration jobs may include batch processing of data from one or more input sources, such as a customer transaction database, into a target destination, such as a data warehouse. In particular embodiments, data integration jobs may include extract, transform, and load (ETL) jobs. In particular embodiments, target data integration module 150 may be characterized as, and/or may comprise, a target data integration system (DIS). In particular embodiments, target data integration module 150 may comprise a DIS that coordinates and/or processes ETL jobs.

Target data integration module 150 may refer to any suitable combination of hardware and/or software implemented in one or more modules to process data and provide the described functions and operations. In particular embodiments, target data integration module 150 and/or any components thereof may include a network server, any suitable remote server, a mainframe, a host computer, a workstation, a web server, a personal computer, a file server, or any other suitable device operable to communicate with other components in system 100 and process data. In particular embodiments, the functions of target data integration module 150 may be performed by any suitable combination of one or more servers or other components at one or more locations. In embodiments where the module is a server, the server may be a private server, and the server may be a virtual or physical server. In the illustrated embodiment, target data integration module 150 comprises interface (I/F) 152, processor 154, target operating system (OS) 156, and memory 158, wherein memory 158 stores target data integration application 160, target DIS files 162, proprietary target DIS files 164, and/or data 166.

Target data integration module 150 may comprise interface 152. In general, interface 152 communicates data for the processing of data integration jobs and other functions of target data integration module 150 among the other elements of system 100. In some embodiments, interface 152 is communicably coupled to processor 154 and may refer to any suitable device operable to receive input for target data integration module 150, send output from target data integration module 150, perform suitable processing of the input or output or both, communicate to other devices, or any combination of the preceding. Interface 152 may include appropriate hardware (e.g., modem, network interface card, etc.) and software, including protocol conversion and data processing capabilities, to communicate through network 110 or other communication system that allows target data integration module 150 to communicate to other components of system 100. Interface 152 may include any suitable software operable to access data from various devices such as source data integration module 120, source scheduler module 140, target data integration module 150, target scheduler module 170, conversion module 180, and/or computers 190. Interface 152 may include any suitable software operable to transmit data to various devices such as source data integration module 120, source scheduler module 140, target data integration module 150, target scheduler module 170, conversion module 180, and/or computers 190. Interface 152 may include one or more ports, conversion software, or both.

Target data integration module 150, and/or some or all of the components of target data integration module 150, may execute or use target operating system 156. In particular embodiments, target data integration module 150, and/or some or all of the components therein, may execute or use some operating systems but not others. In particular embodiments, certain features or functions of target data integration module 150 may execute or use some operating systems but not others. In particular embodiments, target operating system 156 may comprise Solaris, AIX, HP-UX, Linux, UNIX, MS-DOS, PC-DOS, MAC-OS, i-OS, WINDOWS, OpenVMS, z/VSE, IBM's zSeries/Operating System (z/OS), Virtual Server Environment, a .NET environment, or any other appropriate operating system, including future operating systems. In particular embodiments, target operating system 156 may comprise and/or execute or use a different operating system than source operating system 156. In particular embodiments, target operating system 156 may comprise and/or execute or use a version of the Linux or UNIX operating systems.

Target data integration module 150 may comprise processor 154. Processor 154 is generally operable to coordinate and/or process data integration jobs. In particular embodiments, processor 154 may be operable to execute target data integration application 160 and process target DIS files 162, proprietary target DIS files 164 and data 166. Processor 154 may be communicably coupled to interface 152 and/or memory 158. Processor 154 may comprise any suitable combination of hardware and software to execute instructions and manipulate data to perform the described functions for target data integration module 150. In some embodiments, processor 154 may include, for example, one or more computers, one or more central processing units (CPUs), one or more microprocessors, one or more applications, and/or other logic.

Target data integration module 150 may comprise memory 158. In general, memory 158 stores data, including files, applications, and other data, associated with target data integration module 150. Examples of memory 158 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or any other volatile or non-volatile, non-transitory computer-readable memory devices that store one or more files, lists, tables, or other arrangements of information. In particular embodiments, memory 158 may store target data integration application 160, target DIS files 162, proprietary target DIS files 164, and/or data 166. In particular embodiments, memory 158 may store target operating system 156.

Target data integration module 150 may comprise target data integration application 160. Target data integration application 160 generally refers to logic, rules, algorithms, code, tables, and/or other suitable instructions for executing any suitable functions regarding the operation of target data integration module 150. In particular embodiments, target data integration application 160 may execute data integration jobs associated with target data integration module 150. In particular embodiments, target data integration application 160 may comprise a version of IBM's DataStage and/or similar data integration applications. In particular embodiments, source data integration application 130 may be different than target data integration application 160.

Target data integration module 150 may comprise target DIS files 162. In general, target DIS files 162 are files that may assist with any function or operation of target data integration module 150, or any component thereof. In particular embodiments, target DIS files 162 may be specific to the operation of target data integration module 150. In particular embodiments, target DIS files 162 may be specific to the operation of target data integration application 160. In particular embodiments, target DIS files 162 may comprise .dsx, a shell version in .sh format, a shell version in .ksh format, and/or other types of files associated with the operation of DataStage. Other types of files suitable for use with target data integration module 150 may be used as target DIS files 162.

In addition, target data integration module 150 may comprise proprietary target DIS files 164. In general, proprietary target DIS files 164 are proprietary files used by target data integration module 150, or any component thereof, that may assist with any function or operation of target data integration module 150. In particular embodiments, proprietary target DIS files 164 may be specific to the operation of target data integration module 150. Proprietary target DIS files 164 may be customized, modified, and/or non-standard files created by or for a particular user (e.g., a specific organization) for use by target data integration module 150. In particular embodiments, proprietary target DIS files 164 may be specific to the operation of target data integration application 160. In particular embodiments, proprietary target DIS files 164 may comprise .ini and/or other types of files associated with the operation of DataStage. Other types of files suitable for use with target data integration module 150 may be used as proprietary target DIS files 164.

Target data integration module 150 may also contain data 166. Data 166 may comprise any data useful to support the function or operation of target data integration module 150. In particular embodiments, data 166 may comprise data integration jobs and/or data associated with data integration jobs. In particular embodiments, data 166 may comprise a data warehouse and/or any number of databases. In particular embodiments, data 166 may comprise files that assist with the function of target data integration module 150. Data 166, as well as any other data associated with target data integration module 150, including target DIS files 162 and proprietary target DIS files 164, may be stored on any suitable device capable of storing and facilitating retrieval of such data, for example, memory 158.

In general, target scheduler module 170 may manage some or all of the functions of target data integration module 150 or any of its components. In particular embodiments, target scheduler module 170 may provide workload automation. In particular embodiments, target scheduler module 170 may provide event-driven automation, policy-based management, and/or workflow monitoring and reporting capabilities. In particular embodiments, target scheduler module 170 may operate as a scheduler of ETL jobs and/or other data integration jobs. In particular embodiments, target scheduler module 170 may be characterized as, and/or may comprise, a target scheduler tool. In particular embodiments, target scheduler module 170 may comprise a target scheduler tool that manages ETL jobs. In particular embodiments, a target scheduler tool may be part of or associated with a data integration system, such as a target data integration system comprising target data integration module 150.

Target scheduler module 170 may refer to any suitable combination of hardware and/or software implemented in one or more modules to process data and provide the described functions and operations. In particular embodiments, target scheduler module 170 and/or any components thereof may include a network server, any suitable remote server, a mainframe, a host computer, a workstation, a web server, a personal computer, a file server, or any other suitable device operable to communicate with other components in system 100 and process data. In particular embodiments, the functions of target scheduler module 170 may be performed by any suitable combination of one or more servers or other components at one or more locations.

In embodiments where the module is a server, the server may be a private server, and the server may be a virtual or physical server. In the illustrated embodiment, target scheduler module 170 comprises interface (I/F) 172, processor 174, and memory 176, wherein memory 176 stores target scheduler application 177 and target scheduler tool files 178.

In addition, target scheduler module 170, and/or some or all of the components therein, may execute or use an operating system. In particular embodiments, target scheduler module 170, and/or some or all of the components therein, may execute or use some operating systems but not others. In particular embodiments, certain features or functions of target scheduler module 170 may execute or use some operating systems but not others. In particular embodiments, target scheduler module 170 may execute or use the same operating system used by target data integration module 150, such as target operating system 156. In particular embodiments, target scheduler module 170 may execute or use, or be used with servers, databases, and/or other components that execute or use, Solaris, AIX, HP-UX, Linux, UNIX, MS-DOS, PC-DOS, MAC-OS, i-OS, WINDOWS, OpenVMS, z/VSE, IBM's zSeries/Operating System (z/OS), Virtual Server Environment, a .NET environment, or any other appropriate operating system, including future operating systems. In particular embodiments, the operating system executed or used by target scheduler module 170 may be different than the operating system executed or used by source scheduler module 140 and/or source data integration module 120. In particular embodiments, target scheduler module 170 may execute or use a version of the Linux or UNIX operating system.

Target scheduler module 170 may comprise interface (I/F) 172. In general, interface 172 communicates data for the management of data integration jobs and other functions of target scheduler module 170 among the other elements of system 100. In some embodiments, interface 172 is communicably coupled to processor 174 and may refer to any suitable device operable to receive input for target scheduler module 170, send output from target scheduler module 170, perform suitable processing of the input or output or both, communicate to other devices, or any combination of the preceding. Interface 172 may include appropriate hardware (e.g., modem, network interface card, etc.) and software, including protocol conversion and data processing capabilities, to communicate through network 110 or other communication system that allows target scheduler module 170 to communicate to other components of system 100. Interface 172 may include any suitable software operable to access data from various devices such as source data integration module 120, source scheduler module 140, target data integration module 150, target scheduler module 170, conversion module 180, and/or computers 190. Interface 172 may include any suitable software operable to transmit data to various devices such as source data integration module 120, source scheduler module 140, target data integration module 150, target scheduler module 170, conversion module 180, and/or computers 190. Interface 172 may include one or more ports, conversion software, or both.

Target scheduler module 170 may comprise processor 174. Processor 174 is generally operable to manage data integration jobs. In particular embodiments, processor 174 may be operable to execute target scheduler application 177 and process target scheduler tool files 178. Processor 174 may be communicably coupled to interface 172 and/or memory 176. Processor 174 may comprise any suitable combination of hardware and software to execute instructions and manipulate data to perform the described functions for target scheduler module 170. In some embodiments, processor 174 may include, for example, one or more computers, one or more central processing units (CPUs), one or more microprocessors, one or more applications, and/or other logic.

Target scheduler module 170 may comprise memory 176. In general, memory 176 stores data, including files, applications, and other data, associated with target scheduler module 170. Examples of memory 176 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or or any other volatile or non-volatile, non-transitory computer-readable memory devices that store one or more files, lists, tables, or other arrangements of information. In particular embodiments, memory 176 may store target scheduler application 177 and target scheduler tool files 178. In particular embodiments, memory 176 may store an operating system.

Target scheduler module 170 may comprise target scheduler application 177. Target scheduler application 177 generally refers to logic, rules, algorithms, code, tables, and/or other suitable instructions for executing any suitable functions regarding the operation of target scheduler module 170. In particular embodiments, target scheduler application 177 may execute data integration job management functions associated with target scheduler module 170. In particular embodiments, target scheduler application 177 may comprise a version of CA's AutoSys, CA's AutoSys Workload Automation, and/or similar scheduler applications. In particular embodiments, target scheduler application 177 may include mechanisms, such as a job instruction language (JIL), for scheduling ETL jobs and/or other data integration jobs. In particular embodiments, source scheduler application 147 may be different than target scheduler application 177.

Target data integration module 150 may comprise target scheduler tool files 178. In general, target scheduler tool files 178 are files that may assist with any function or operation of target scheduler module 170, or any component thereof. In particular embodiments, target scheduler tool files 178 may be specific to the operation of target scheduler module 170. In particular embodiments, target scheduler tool files 178 may be specific to the operation of target scheduler application 177. In particular embodiments, target scheduler tool files 178 may comprise .jil and/or other types of files associated with the operation of AutoSys, AutoSys Workload Automation, and/or DataStage. Other types of files suitable for use with target scheduler module 170 may be used as target scheduler tool files 178. In particular embodiments, target scheduler tool files 178 may be proprietary.

In general, conversion module 180 may coordinate and/or perform the conversion of data associated with source data integration module 120 to data associated with target data integration module 150. In addition, conversion module 180 may coordinate and/or perform the conversion of data associated with source scheduler module 140 to data associated with target scheduler module 170. In particular embodiments, conversion module 180 may coordinate and/or perform the conversion of source DIS files 132 to target DIS files 162. In particular embodiments, conversion module 180 may coordinate and/or perform the conversion of proprietary source DIS files 134 to proprietary target DIS files 164. In particular embodiments, conversion module 180 may coordinate and/or perform the conversion of source scheduler tool files 148 to target scheduler tool files 178.

In particular embodiments, conversion module 180 may coordinate and/or perform the conversion of (1) data associated with a source data integration module 120 or source scheduler module 140, where modules 120 and 140 are associated with a source operating system 126, to (2) data associated with a target data integration module 150 or target scheduler module 170, where modules 150 and 170 are associated with a target operating system 156, and (3) where source operating system 126 is not the same as (is different than) target operating system 156. In particular embodiments, conversion module 180 may coordinate and/or perform the conversion of data associated with any component of system 100 to data associated with any other component of system 100.

In particular embodiments, conversion module 180 may coordinate and/or perform the conversion of data where source operating system 126 is a version of a WINDOWS operating system and target operating system 156 is a version of a Linux or UNIX operating system. Source operating system 126 may also not be the same as (may be different than) target operating system 156 if each is a different version of the same operating system.

In particular embodiments, conversion module 180 may coordinate and/or perform the conversion of data associated with ETL jobs. In particular embodiments, conversion module 180 may coordinate and/or perform the conversion of data associated with a particular application, such as a version of DataStage.

Conversion module 180 may execute or use any suitable operating system and may refer to any suitable combination of hardware and/or software implemented in one or more modules to process data and provide the described functions and operations. In particular embodiments, conversion module 180 and/or any components thereof may include a network server, any suitable remote server, a mainframe, a host computer, a workstation, a web server, a personal computer, a file server, or any other suitable device operable to communicate with other components in system 100 and process data. In particular embodiments, the functions of conversion module 180 may be performed by any suitable combination of one or more servers or other components at one or more locations. In embodiments where the module is a server, the server may be a private server, and the server may be a virtual or physical server. In the illustrated embodiment, conversion module 180 includes interface (I/F) 182, processor 184, and memory 186, wherein memory 186 stores conversion algorithm 188.

Conversion module 180 may comprise interface 182. In general, interface 182 communicates data for the conversion of data and other functions of conversion module 180 among the other elements of system 100. In some embodiments, interface 182 is communicably coupled to processor 184 and may refer to any suitable device operable to receive input for conversion module 180, send output from conversion module 180, perform suitable processing of the input or output or both, communicate to other devices, or any combination of the preceding. Interface 182 may include appropriate hardware (e.g., modem, network interface card, etc.) and software, including protocol conversion and data processing capabilities, to communicate through network 110 or other communication system that allows conversion module 180 to communicate to other components of system 100. Interface 182 may include any suitable software operable to access data from various devices such as source data integration module 120, source scheduler module 140, target data integration module 150, target scheduler module 170, conversion module 180, and/or computers 190. Interface 182 may include any suitable software operable to transmit data to various devices such as source data integration module 120, source scheduler module 140, target data integration module 150, target scheduler module 170, conversion module 180, and/or computers 190. Interface 182 may include one or more ports, conversion software, or both.

Conversion module 180 may comprise processor 184. Processor 184 is generally operable to convert data. In particular embodiments, processor 184 may be operable to execute conversion algorithm 188. Processor 184 may be communicably coupled to interface 182 and/or memory 186. Processor 184 may comprise any suitable combination of hardware and software to execute instructions and manipulate data to perform the described functions for target scheduler module 170. In some embodiments, processor 184 may include, for example, one or more computers, one or more central processing units (CPUs), one or more microprocessors, one or more applications, and/or other logic.

Conversion module 180 may comprise memory 186. In general, memory 186 stores data, including files, applications, and other data, associated with conversion module 180. In particular embodiments, memory 186 may include computer memory (e.g., RAM or ROM), mass storage media (e.g., a hard disk), removable storage media (e.g., a CD or a DVD), database and/or network storage (e.g., a server), and/or or any other volatile or non-volatile, non-transitory computer-readable memory devices that store one or more files, lists, tables, or other arrangements of information. Although FIG. 1 illustrates memory 186 as internal to conversion module 180, it should be understood that memory 186 may be internal or external to conversion module 180, depending on particular implementations. Also, memory 186 may be separate from or integral to other memory devices or components of system 100, such as source data integration module 120 or target data integration module 150, to achieve any suitable arrangement of memory devices for use by conversion module 180. In particular embodiments, memory 186 may store conversion algorithm 188 and/or any other data suitable for use by conversion module 180.

Conversion module 180 may comprise conversion algorithm 188. Conversion algorithm 188 generally refers to logic, rules, algorithms, code, tables, arrays, and/or other suitable instructions for executing any suitable functions regarding the operation of conversion module 180. In particular embodiments, conversion algorithm 188 may execute the conversion of (1) data associated with source data integration module 120 to data associated with target data integration module 150 and/or (2) data associated with source scheduler module 140 to data associated with target scheduler module 170. In particular embodiments, conversion algorithm 188 may be suitable for converting data associated with any component of system 100 to data associated with any other component of system 100. In particular embodiments, conversion algorithm 188 may be suitable for converting data associated with ETL jobs, including for example, .dsx, .bat, .sh, .ksh, .jil, and/or .ini files, whether proprietary or not, from source data integration module 120 to target data integration module 150 or from source scheduler module 140 to target scheduler module 170. In particular embodiments, conversion algorithm 188 may be suitable for converting data associated with a particular data integration system or data integration system application, such as a version of DataStage. In particular embodiments, conversion algorithm 188 may be coded in the Perl programming language, or any other programming language.

System 100 may include computers 190, and computers 190 may comprise computers 190*a*-190*n*, where n represents any suitable number, that communicate with any component of system 100. In particular embodiments, computers 190 may communicate with other components of system 100 via network 110. For example, computers 190 may communicate, or load programs that communicate, with source data integration module 120 regarding the execution of data integration jobs. In particular embodiments, computers 190 may communicate with components of system 100 regarding the conversion of (1) source DIS files 132 to target DIS files 162, (2) proprietary source DIS files 134 to proprietary target DIS files 164, and/or (3) source scheduler tool files 148 to target scheduler tool files 178 or any combination thereof (for example, the conversion of source DIS files 132 to proprietary target DIS files 164). In particular embodiments, computers 190 may comprise the computers of general users and/or administrators of system 100 or any component thereof. Computers 190 may include a personal computer, a workstation, a laptop, a wireless or cellular telephone, an electronic notebook, a personal digital assistant, a smartphone, a netbook, a tablet, a slate personal computer, or any other device (wireless, wireline, or otherwise) capable of receiving, processing, storing, and/or communicating information with other components of 100. Computers 190 may also comprise a user interface, such as a display, keyboard, mouse, or other appropriate terminal equipment.

A component of system 100 may include one or more of an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the disclosure. For example, system 100 may include any number of source data integration modules 120, source scheduler modules 140, target data integration modules 150, target scheduler modules 170, conversion modules 180, computers 190, and/or networks 110. Particular components may be integrated or separated. Although components of system 100 are illustrated as separate components in FIG. 1, in some embodiments, components of system 100 may share one or more components or be further separated. For example, source data integration module 120 and conversion module 180 may share a memory, such as memory 186, that may comprise both conversion algorithm 188, data 136, and data 166. As another example, files 132, 134, and 148 may be stored together and/or files 162, 164, and 178 may be stored together in a different location than depicted, such as on computers 190 or some other storage location accessible via network 110. In particular embodiments, components of system 100 may be implemented on virtual machines. Moreover, the operations may be performed by more, fewer, or other components and in different configurations. Additionally, any operations, such as converting data, may be performed using any suitable logic comprising software, hardware, and/or other logic. As used in this document, "each" refers to each member of a set or each member of a subset of a set.

FIG. 2 illustrates a flowchart of an example method 200 of creating a conversion algorithm, according to a particular embodiment. In particular embodiments, one or more steps of method 200 may be performed by components of system 100 of FIG. 1. In particular embodiments, one or more steps of method 200 may be incorporated into all or part of method 300 of FIG. 3.

Method 200 begins at step 210. At step 210, a data integration system that executes or uses a source operating system (a "source data integration system") is analyzed. For example, at step 210, a data integration system may be analyzed to determine how the data integration system functions, which may include analyzing how the data integration system functions when executing or using a particular operating system. In particular embodiments, a system, such as system 100 or components therein, may analyze a data integration system, such as source data integration module 120 or any components therein. For example, system 100 may analyze source data integration application 130 and associated components. In this example, system 100 may identify data associated with source data integration module 120, such as tokens associated with source data integration application 130. System 100 may further collect the tokens and move, copy, or organize them for further analysis, which may include organizing the tokens in an array. System 100 may further analyze the format of the tokens, which, in this example, are associated with source data integration application 130. System 100 may also store data associated with the format of the tokens. In particular embodiments, the format of tokens may be associated with the format of .dsx, .bat, .sh, .ksh, .ini, and/or .jil files associated with ETL jobs.

In particular embodiments, the data integration system being analyzed in step 210 may execute or use any operating system, such as a version of the Windows operating system. In particular embodiments, step 210 may comprise the analysis of any data integration application, such as a version of DataStage. In particular embodiments, the data integration application being analyzed may be adapted to execute or use a version of the Windows operating system. In particular embodiments, tokens or other data associated with a data integration application, such as a version of DataStage, may have or describe a format specific to a Windows operating system. In particular embodiments, tokens may be associated with components of a data integration system, for example source DIS files 132 and/or proprietary source DIS files 134. In particular embodiments, tokens may describe the format or other characteristics of components of a data integration system, for example the format of source DIS files 132 and/or proprietary source DIS files 134. In particular embodiments, all or less than all tokens associated with a source data integration system are analyzed.

In particular embodiments, step 210 is fully applicable to scheduler tools, such as source scheduler module 140 and/or any components therein, including associated tokens. For example, source scheduler application 147, including tokens associated with source scheduler application 147, and source scheduler tool files 148 may be analyzed in accordance with all applicable variations of step 210.

At step 212, a data integration system that executes or uses a target operating system (a "target data integration system") is analyzed. For example, a data integration system may be analyzed to determine how the data integration system functions, which may include analyzing how the data integration system functions when executing or using a particular operating system. In particular embodiments, the target operating system of step 212 may be different than the source operating system of step 210. In particular embodiments, a system, such as system 100 or components therein, may analyze a data integration system, such as target data integration module 150 or any components therein. For example, system 100 may analyze target data integration application 160 and associated components. In this example, system 100 may identify data associated with target data integration module 150, such as tokens associated with target data integration application 160. System 100 may further collect the tokens and move, copy, or organize them for further analysis, which may include organizing the tokens in an array. System 100 may further analyze the format of the tokens, which, in this example, are associated with target data integration application 160. System 100 may also store data associated with the format of the tokens. In particular embodiments, the format of tokens may be associated with the format of .dsx, .bat, .sh, .ksh, .ini, and/or .jil files associated with ETL jobs.

In particular embodiments, the data integration system being analyzed in step 212 may execute or use any operating system, such as a version of the Linux or UNIX operating systems. In particular embodiments, step 212 may comprise the analysis of any data integration application, such as a version of DataStage. In particular embodiments, the data integration application being analyzed may be adapted to execute or use a version of the Linux or UNIX operating system. In particular embodiments, tokens or other data associated with a data integration application, such as a version of DataStage, may have or describe a format specific to a Linux or UNIX operating system. In particular embodiments, tokens may be associated with components of a data integration system, for example target DIS files 162 and/or proprietary target DIS files 164. In particular embodiments, tokens may describe the format or other characteristics of components of a data integration system, for example the format of target DIS files 162 and/or proprietary target DIS files 164. In particular embodiments, all or less than all tokens associated with a target data integration system are analyzed.

In particular embodiments, step 212 is fully applicable to scheduler tools, such as target scheduler module 170 and/or any components therein, including associated tokens. For example, target scheduler application 177, including tokens associated with target scheduler application 177, and target scheduler tool files 178 may be analyzed in accordance with all applicable variations of step 212.

At step 214, differences between the target data integration system of step 212 and the source data integration system of step 210 are determined. For example, differences between how the target data integration system and how the source data integration system function may be determined. In particular embodiments, differences between tokens associated with the target data integration system ("target tokens") and tokens associated with the source data integration system ("source tokens") may be determined. In particular embodiments, a system, such as system 100 or components therein, may determine differences between a target data integration system and a source data integration system. Differences between a target data integration system and a source data integration system may be determined in any suitable manner. For example, target tokens associated with target data integration module 150 may be compared with source tokens associated with source data integration module 120. In this example, the target tokens may be associated with target data integration application 160 and the source tokens may be associated with source data integration application 130. Further, in this example, the target tokens may be associated with target DIS files 162 and/or proprietary target DIS files 164, and source tokens may be associated with source DIS files 132 and/or proprietary target DIS files 164. In this example, format differences between target tokens and source tokens may be determined. System 100 may also store data associated with the differences between the format of target tokens and source tokens. In particular embodiments, all or less than all of the differences between a set of target tokens and a set of source tokens are determined. In particular embodiments, the format of tokens may be associated with the format of .dsx, .bat, .sh, .ksh, .ini, and/or jil files associated with ETL jobs.

In particular embodiments, step 214 is fully applicable to target and source scheduler tools, such as target scheduler module 170, source scheduler module 140, and/or any components therein, including associated tokens. For example, differences between (1) target scheduler application 177, including tokens associated with target scheduler application 177, and target scheduler tool files 178 and (2) source scheduler application 147, including tokens associated with source scheduler application 147, and source scheduler tool files 148 may be determined in accordance with all applicable variations of step 214.

At step 216, transformation rules for conversion are determined. In particular embodiments, transformation rules describe how to convert data associated with a source data integration system to data associated with a target data integration system. For example, in the context of system 100, transformation rules may describe how to convert (1) source DIS files 132 to target DIS files 162, (2) proprietary source DIS files 134 to proprietary target DIS files 164, (3) source scheduler tool files 148 to target scheduler tool files 178, and/or any combination thereof (for example, the conversion of source DIS files 132 to proprietary target DIS files 164). Transformation rules may comprise logic, rules, algorithms, code, tables, arrays, and/or other suitable instructions for converting data associated with a source data integration system to data associated with a target data integration system. In particular embodiments, transformation rules may be based, at least in part, on differences between the target data integration system and the source data integration system, such as the differences determined at step 214. In particular embodiments, transformation rules may be based, at least in part, on differences between target tokens and source tokens. Transformation rules may be determined in any suitable manner. In particular embodiments, transformation rules may describe how to parse source DIS files 132, proprietary source DIS files 134, target DIS files 162, proprietary target DIS files 164, source scheduler tool files 148, and/or target scheduler tool files 178, based at least in part, on the format of tokens associated with these files and/or other components of system 100.

In particular embodiments, a system, such as system 100 and/or components therein, may determine transformation rules using a series of sub-steps. For example, system 100 may first identify a first target token. System 100 may then determine if a source token is analogous to the first target token. If a source token is analogous to the first target token, system 100 may determine one or more transformation rules that describe how to convert data associated with the analogous source token to data associated with the first target token. More particularly, if a source token is analogous to the first target token, system 100 may determine, based at least in part on differences between the analogous source token and the first target token, one or more transformation rules that describe how to convert the format of the analogous source token to the format of the first target token. System 100 may store the one or more transformation rules. If, on the other hand, no source token is analogous to the first target token, system 100 may determine one or more transformation rules and/or other rules that accounts for the fact that the first target token lacks an analogous source token. System 100 may store the one or more transformation rules and/or other rules. Similar to the series of sub-steps described above, system 100 may identify a first source token, determine whether an analogous target token exists, and determine one or more transformation and/or other rules. System 100 may repeat any or all of the sub-steps described above until some or all target tokens and/or source tokens are analyzed. System 100 may store and/or organize any or all of the determined transformation rules by, for example, storing them in an array in any manner suitable to assist with the conversion of data associated with a source data integration system to data associated with a target data integration system. In particular embodiments, a given target token may have none, one, or more than one analogous source tokens, and a given source token may have none, one, or more than one analogous target tokens. In particular embodiments, the format of tokens may be associated with the format of .dsx, .bat, .sh, .ksh, .ini, and/or .jil files associated with ETL jobs.

In particular embodiments, step 216 is fully applicable to target and source scheduler tools, such as target scheduler module 170, source scheduler module 140, and/or any components therein, including associated tokens. For example, transformation rules describing how to convert data associated with a source scheduler tool, such as source scheduler module 140, to data associated with a target scheduler tool, such as target scheduler module 170, may be determined in accordance with all applicable variations of step 216. In particular embodiments, transformation rules may be based, at least in part, upon differences between (1) target scheduler application 177, including tokens associated with target scheduler application 177, and target scheduler tool files 178 and (2) source scheduler application 147, including tokens associated with source scheduler application 147, and source scheduler tool files 148 in accordance with all applicable variations of step 216.

At step 218, a conversion algorithm is created. In particular embodiments, a conversion algorithm may be the same as or different from conversion algorithm 188. In particular embodiments, a conversion algorithm may be executed to convert data associated with a source data integration system to data associated with a target data integration system. For example, in the context of system 100, conversion algorithm 188 may be executed to convert (1) source DIS files 132 to target DIS files 162, (2) proprietary source DIS files 134 to proprietary target DIS files 164, and/or (3) source scheduler tool files 148 to target scheduler tool files 178 or any combination thereof (for example, the conversion of source DIS files 132 to proprietary target DIS files 164). In particular embodiments, such as in the context of system 100, conversion algorithm 188 may be suitable for converting data associated with any component of system 100 to data associated with any other component of system 100. In particular embodiments, conversion algorithm 188 may be suitable for converting data associated with ETL jobs, including for example, .dsx, .bat, .sh, .ksh, .jil, and/or .ini files, whether proprietary or not, from source data integration module 120 to target data integration module 150 or from source scheduler module 140 to target scheduler module 170. In particular embodiments, a conversion algorithm may be suitable for converting data associated with a particular data integration system or data integration system application, such as a version of DataStage. In particular embodiments, a conversion algorithm may be suitable for converting data associated with a source operating system to data associated with a target operating system, wherein the source operating system may be different than the target operating system. In particular embodiments, a conversion algorithm may be executed to parse source DIS files 132, proprietary source DIS files 134, target DIS files 162, proprietary target DIS files 164, source scheduler tool files 148, and/or target scheduler tool files 178, based at least in part, on the format of tokens associated with these files.

In particular embodiments, a conversion algorithm may comprise logic, rules, algorithms, code, tables, arrays, and/or other suitable instructions for converting data associated with a source data integration system to data associated with a target data integration system. In particular embodiments, a conversion algorithm may be based, at least in part, on one or more transformation rules, such as the transformation rules determined at step 216. In particular embodiments, a conversion algorithm may be coded using the Perl programming language, or any other programming language.

In particular embodiments, step 218 is fully applicable to target and source scheduler tools, such as target scheduler module 170, source scheduler module 140, and/or any components therein. For example, a conversion algorithm may be executable to convert data associated with a source scheduler tool, such as source scheduler module 140, to data associated with a target scheduler tool, such as target scheduler module 170, may be determined in accordance with all applicable variations of step 218. In particular embodiments, a conversion algorithm may be suitable for converting data associated with a particular scheduler tool or scheduler application, such as a version of AutoSys, or AutoSys Workload Automation.

In particular embodiments, a conversion algorithm may be based, at least in part, on one or more transformation rules, such as the transformation rules determined at step 216.

The steps of method 200 may be, in particular embodiments, performed to create a conversion algorithm associated with any components of system 100. For example, method 200 may be performed to create a conversion algorithm that, when executed, converts data associated with source scheduler module 140 to data associated with target scheduler module 170.

In particular embodiments of method 200, a user, a system, and/or component of a system, such as system 100, may perform all steps, any step, or any part of a step. In particular embodiments, a user, system, and/or component of a system may cause an application to perform all steps, any step, or any part of a step. Additionally, in particular embodiments, a user may perform and/or code each step, or any portion thereof, using the Perl programming language, or any other programming language. In particular embodiments, users may be administrators of system 100 and may access system 100 by any means, such as by computers 190.

The steps of method 200 are given as example combinations of steps for creating a conversion algorithm. Some of the steps may be performed in a different order, omitted, or repeated where appropriate. Additionally, one of skill in the art will recognize other combinations of steps, including additional steps, are possible without departing from the scope of the present disclosure.

FIG. 3 illustrates a flowchart of an example method of converting data, such as data integration system files, between data integration systems executing or using different operating systems, according to a particular embodiment. In particular embodiments, one or more steps of method 300 may be performed by components of system 100 of FIG. 1.

Method 300 begins at step 310. At step 310, a data integration system that executes or uses a source operating system (a "source data integration system") is identified. In particular embodiments, a user or system may identify a source data integration system, including data, such as files, associated with the source data integration system, that the user or system seeks to convert. In particular embodiments, a source data integration system may be an existing, outdated, or old data integration system. In particular embodiments, a source data integration system may be associated with a source operating system, such that the source data integration system executes or uses the source operating system. For example, in system 100, a source data integration system, such as source data integration module 120 or any component therein, may execute or use source operating system 126. In this example, source data integration application 130, which may execute or use source operating system 126, may be identified. In particular embodiments, a source data integration system may execute or use any operating system suitable to assist with the performance of the source data integration system. In particular embodiments, source data integration application 130 may be a version of DataStage, and source operating system 126 may be a version of a Windows operating system.

In particular embodiments, step 310 is fully applicable to scheduler tools, such as source scheduler module 140 and/or any components or data therein, including source scheduler application 147. For example, source scheduler application 147, which may execute or use source operating system 126, may be identified in accordance with all applicable variations of step 310. In particular embodiments, source scheduler application 147 may be a version of AutoSys or AutoSys Workload Automation.

At step 312, a data integration system that executes or uses a target operating system (a "target data integration system") is identified. In particular embodiments, a user or system may identify a target data integration system, including data, such as files, associated with the target data integration system, to which the user or system seeks to convert. In particular embodiments, the user or system may seek to convert data associated with the source data integration system to data associated with the target data integration system. In particular embodiments, a target data integration system may be an existing, updated, or new data integration system. In particular embodiments, a target data integration system may be associated with a target operating system, such that the target data integration system executes or uses the target operating system. For example, in system 100, a target data integration system, such as target data integration module 150 or any component therein, may execute or use target operating system 156. In this example, target data integration application 160, which may execute or use target operating system 156, may be identified. In particular embodiments, a target data integration system may execute or use any operating system suitable to assist with the performance of the target data integration system. In particular embodiments, target data integration application 160 may be a version of DataStage, and target operating system 156 may be a version of a Linux or UNIX operating system.

In particular embodiments, step 312 is fully applicable to scheduler tools, such as target scheduler module 170 and/or any components or data therein, including target scheduler application 177. For example, target scheduler application 177, which may execute or use target operating system 156, may be identified in accordance with all applicable variations of step 312. In particular embodiments, target scheduler application 177 may be a version of AutoSys or AutoSys Workload Automation.

At step 314, data associated with a source data integration system is converted to data associated with a target data integration system by using a conversion algorithm. In particular embodiments, conversion algorithm 188 may be used. In particular embodiments, the conversion algorithm of method 200 may be used. In particular embodiments, in preparation for conversion, a user or system may create a directory structure to store data associated with the target data integration system. In particular embodiments, in preparation for conversion, a user or system may copy or move data associated with the source and/or target data integration systems to a location for conversion, for example conversion module 180. In particular embodiments, for example, the data associated with the source data integration system that is to be converted from may be source DIS files 132 and/or proprietary source DIS files 134. In this example, the data associated with the target data integration system that is to be converted to may be target DIS files 162 and/or proprietary target DIS files 164. In particular embodiments, source DIS files 132, proprietary source DIS files 134, target DIS files 162, and/or proprietary target DIS files 164 may comprise various file types, such as .dsx, .bat, .sh, .ksh, .ini, and/or .jil files, which may be associated with ETL jobs.

In particular embodiments, conversion may occur using a series of sub-steps. For example, step 314 may convert source DIS files 132 and/or proprietary source DIS files 134 to target DIS files 162 and/or proprietary target DIS files 164. Source DIS files 132 and/or proprietary source DIS files 134 may comprise various file types, such as .dsx, .bat, .sh, .ksh, .ini, and/or .jil files. In preparation for conversion, a user or system may copy or move source DIS files 132 and/or proprietary source DIS files 134 to a location for conversion, such as conversion module 180. If one file type is to be converted, a conversion algorithm may be used to parse source DIS files 132 and/or proprietary source DIS files 134 based on associated tokens ("source tokens"). The conversion algorithm may then identify a first source token and determine, based on, for example, transformation rules determined in method 200, whether the first source token should be converted to an at least one first target token. If the conversion algorithm determines that the first source token should be converted, it converts the first source token to the first target token. The conversion algorithm may send the first target token to a post-conversion file. If the conversion algorithm determines that the first source token should not be converted, it may send the first source token to the post-conversion file unconverted. The conversion algorithm may repeat any sub-steps until some or all source tokens have been converted to target tokens and/or sent to post-conversion file. Alternatively, if, in this example, more than one file type is to be converted, the conversion algorithm may isolate each file type and convert it according to some or all of the sub-steps that may be used to convert a single file type, such as those described in this example. The conversion algorithm may repeat any sub-steps until some or all source tokens for some or all file types have been converted to target tokens and/or sent to post-conversion file. Once conversion is complete, the conversion algorithm may assemble target DIS files 162 and/or proprietary target DIS files 164 based on associated target tokens and/or unconverted source tokens contained in the post-conversion file. In particular embodiments, once conversion is complete, a user or system may move, delete, or maintain source DIS files 132 and/or proprietary source DIS files 134 from the location for conversion, such as conversion module 180. In particular embodiments, a post-conversion file may be one or more files, databases, directory structures, or any other organization of data. In particular embodiments, a post-conversion file may be located on any component of system 100, for example on conversion module 180 or target data integration module 150.

In particular embodiments, step 314 is fully applicable to the conversion of data associated with scheduler tools and/or any components therein, such as the conversion of data associated with source scheduler module 140, and/or any components therein, to data associated with target scheduler module 170. For example, source scheduler tool files 148, which may be of various file types, may be converted to target scheduler tool files 178 based on associated tokens, in accordance with all applicable variations of step 314.

At step 316, the converted data associated with the target data integration system is transmitted to the target data integration system. In particular embodiments, the converted data created at step 314, which may include any unconverted data, may be transmitted to the target data integration system. In particular embodiments, converted target DIS files 162 and/or converted proprietary target DIS files 164 created at step 314 may be transmitted to the target data integration system, such as target data integration module 150. In particular embodiments, converted data associated with the target data integration system may transmitted to any location accessible by the target data integration system, such as target data integration module 150. In particular embodiments, further processing of the converted data associated with the target data integration system may occur. In particular embodiments described by system 100, additional data representing ETL job data may be transmitted from source data integration module 120 to any location accessible by target data integration module 150. In particular embodiments, some or all data associated with source data integration module 120 that was not processed by conversion module 180 during step 314 may be (1) transmitted to target data integration module 150 and (2) processed and/or combined with the converted data created at step 314 to create (3) functioning ETL jobs on target data integration module 150 that contain information originally associated with source data integration module 120.

In particular embodiments, step 316 is fully applicable to the transmission of data to a scheduler tool and/or any components therein, such as the transmission of converted data associated with a target scheduler tool to a target scheduler tool. For example, in particular embodiments, converted data created at step 314 may be transmitted to target scheduler module 170, and/or any components therein, in accordance with all applicable variations of step 316.

At step 318, converted data associated with the target data integration system is used (or executed) by the target data integration system. In particular embodiments, any data transferred at step 316 may be used by the target data integration system. In particular embodiments, converted target DIS files 162 and/or converted proprietary target DIS files 164 created at step 314 may be used by the target data integration system, such as target data integration module 150. In particular embodiments, once data, such as converted data transferred at step 316, is made available for use by the target data integration system, the data made available for use may be verified. In particular embodiments, verification of data may comprise determining whether the target data integration system functions suitably, as expected, and/or as intended. In particular embodiments, any data may be verified by any component of system 100.

In particular embodiments, step 318 is fully applicable to scheduler tools, and/or any components therein. For example, the use of converted data by a target scheduler tool, such as target scheduler module 170, may occur in accordance with all applicable variations of step 318.

The steps of method 300 may be, in particular embodiments, performed to convert data associated with any components of system 100. For example, method 300 may be performed to convert data associated with source scheduler module 140 to data associated with target scheduler module 170.

In particular embodiments of method 300, a user, a system, and/or component of a system, such as system 100, may perform all steps, any step, or any part of a step. In particular embodiments, a user, system, and/or component of a system may cause an application to perform all steps, any step, or any part of a step. Additionally, in particular embodiments, a user may perform and/or code each step, or any portion thereof, using the Perl programming language, or any other programming language. In particular embodiments, users may be administrators of system 100 and may access system 100 by any means, such as by computers 190.

The steps of method 300 are given as example combinations of steps for converting data, such as data integration system files, between data integration systems executing or using different operating systems. Some of the steps may be performed in a different order, omitted, or repeated where appropriate. Additionally, one of skill in the art will recognize other combinations of steps, including additional steps, are possible without departing from the scope of the present disclosure.

Certain embodiments of the present disclosure may provide one or more technical advantages. For example, converting files between different data integration systems may be difficult, costly, and time consuming. The difficulty, cost, and time required may increase greatly if the different data integration systems execute or use different operating systems. When the operating systems are different, even files associated with the same data integration system application, for example, DataStage, may not be usable between both data integration systems without conversion. Thus, creating a reliable way to convert between data integration systems executing or using different operating systems increases the flexibility that an organization has vis-à-vis its data integration systems. For example, if an organization obtains new servers that execute or use a different operating system than the current or old servers, being able to convert data integration files between the two sets of servers allows the organization to more readily and inexpensively upgrade its data integration systems.

As another example advantage, compared to trying to convert each data integration application file one-by-one, a system and/or a conversion algorithm that accounts for some or all of the differences between data integration systems that execute or use different operating systems may be superior for several reasons. As one example, a system and/or conversion algorithm may be able to convert data integration system files significantly more quickly than through a one-by one approach. As second example, by understanding the differences between data integration systems, a conversion algorithm may be created that is able to automatically bulk-convert some or all files between the data integration systems in one short period of time. Automatic bulk-converting thus saves organizations effort, money, and time. In addition, a conversion algorithm may allow for repeat conversions with little or no analysis needed beyond creating the initial conversion algorithm.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system, comprising:
a memory operable to store data associated with at a least one data integration system; and
a processor communicatively coupled to the memory and the processor is operable to:
identify a first data integration system that uses a first operating system;
identify a first file format associated with data for the first data integration system, wherein the first file format is specific to the first operating system;
identify a second data integration system that that uses a second operating system, wherein the first operating system is different than the second operating system;
identify a second file format associated with data for the second data integration system, wherein the second file format is specific to the second operating system;
determine a plurality of differences between the first data integration system and the second data integration system, wherein the plurality of differences comprises:
format differences between the first file format and the second file format; and
operation differences between the first data integration system and the second data integration system;
determine a set of transformation rules, based at least in part on at least one of the plurality of differences, wherein the set of transformation rules describe how to convert data from the first file format to the second file format;
create a conversion algorithm, based at least in part on the set of transformation rules;
execute the conversion algorithm to convert a set of files associated with the first data integration system to a corresponding set of files associated with the second data integration system, wherein converting the set of files associated with the first data integration system comprises:
parsing the set of files associated with the first data integration system into a plurality of source tokens;
identifying source tokens from among the plurality of source tokens to convert to a target token;

converting the identified source tokens into target tokens;

sending the target tokens to a post-conversion file;

sending source tokens from among the plurality of source files that were not converted to target tokens to the post-conversion file; and assembling the file associated with the second data integration system using source tokens and target tokens in the post-conversion file; and execute the second data integration system, wherein the second data integration system uses at least one of the converted files associated with the second data integration system.

2. The system of claim 1, wherein the plurality, of differences are determined, based least in part, on an additional plurality of differences between:

a first set of tokens associated with the first data integration system; and a second set of tokens associated with the second data integration system.

3. The system of claim 1, wherein:

the file associated with the first data integration system comprises a first set of multiple files, wherein the first set of multiple files comprises at least one of a .dsx and a .bat file associated with a first data integration application, wherein the first data integration application comprises instructions for executing at least one function of the first data integration system; and the file associated with the second data integration system comprises a second set of multiple files, wherein the second set of multiple files comprises at least one of a .dsx, a .sh, and a .ksh file associated with a second data integration application, wherein the second data integration application comprises instructions for executing at least one function of the second data integration system.

4. The system of claim 3, Wherein:

the first operating system is a version of a Windows operating system;

the second operating system is a version of a Linux operating system;

the first data integration application is a first version of DataStage; and the second data integration application is a second version of DataStage.

5. The system of claim 1, wherein;

the first data integration system comprises a first scheduler tool, wherein the first scheduler tool manages at least one function of a third data integration system; and the second data integration system comprises a second scheduler tool, wherein the second scheduler tool manages at least one function of a fourth data integration system.

6. The system of claim 1, wherein;

the first data integration system further comprises a first scheduler tool that uses the first operating system, wherein the first scheduler tool manages at least one function of the first data integration system;

the second data integration system further comprises a second scheduler tool that uses the second operating system, wherein the second scheduler tool manages at least one function of the second data integration system; and the processor is further operable to:

determine an additional plurality of differences between the first scheduler tool and the second scheduler tool;

determine an additional set of transformation rules, based at least in part on at least one of the additional plurality of differences;

create an additional conversion algorithm, based at least in part on the additional set of transformation rules;

execute the additional conversion algorithm to convert a file associated with the first scheduler tool to a file associated with the second scheduler tool; and execute the second scheduler tool, wherein the second scheduler tool uses the second at least one file.

7. The system of claim 6, wherein:

the file associated with the first scheduler tool is a .jil file associated with a first scheduler application; and the file associated with the second scheduler tool is a .jil file associated with a second scheduler application.

8. One or more non-transitory computer-readable media comprising logic, the logic When executed by one or more processors operable to perform operations comprising:

identifying a first data integration system that uses a first operating system;

identifying a first file format associated with data for the first data integration system, wherein the first file format is specific to the first operating system;

identifying a second data integration system that that uses a second operating system, wherein the first operating system is different than the second operating system;

identifying a second file format associated with data for the second data integration system, wherein the second file format is specific to the second operating system;

determining a plurality of differences between the first data integration system and the second data integration system, wherein the plurality of differences comprises:

format differences between the first file format and the second file format; and operation differences between the first data integration system and the second data integration system;

determining a set of transformation rules, based at least in part on at least one of the plurality of differences, wherein the set of transformation rules describe how to convert data from the first file format to the second file format;

creating a conversion algorithm, based at least in part on the set of transformation rules;

executing the conversion algorithm to convert a set of files associated with the first data integration system to a corresponding set of files associated with the second data integration system, wherein converting the set of files associated with the first data integration system comprises:

parsing the set of files associated with the first data integration system into a plurality of source tokens;

identifying source tokens from among the plurality of source tokens to convert to a target token;

converting the identified source tokens into target tokens;

sending the target tokens to a post-conversion file;

sending source tokens from among the plurality of source files that were not converted to target tokens to the post-conversion file; and assembling the file associated with the second data integration system using source tokens and target tokens in the post-conversion file; and executing the second data integration system, wherein the second data integration system uses at least one of the converted files associated with the second data integration system.

9. The media of claim 8, wherein the plurality of differences are determined, based least in part, on an additional plurality of differences between:
a first set of tokens associated with the first data integration system; and
a second set of tokens associated with the second data integration system.

10. The media of claim 8, wherein:
the file associated with the first data integration system comprises a first set of multiple files, wherein the first set of multiple files comprises at least one of a .dsx and a .bat file associated with a first data integration application, wherein the first data integration application comprises instructions for executing at least one function of the first data integration system; and
the file associated with the second data integration system comprises a second set of multiple files, wherein the second set of multiple files comprises at least one of a .dsx, a .sh, and .ksh file associated with a second data integration application, wherein the second data integration application comprises instructions for executing at least one function of the second data integration system.

11. The media of claim 10, wherein:
the first operating system is a version of a Windows operating system;
the second operating system is a version of a Linux operating system;
the first data integration application is a first version of DataStage; and
the second data integration application is a second version of DataStage.

12. The media of claim 8, wherein:
the first data integration system comprises a first scheduler tool, wherein the first scheduler tool manages at least one function of a third data integration system; and
the second data integration system comprises a second scheduler tool, wherein the second scheduler tool manages at least one function of a fourth data integration system.

13. The media of claim 8, wherein:
the first data integration system further comprises a first scheduler tool that uses the first operating system, wherein the first scheduler tool manages at least one function of the first data integration system;
the second data integration system further comprises a second scheduler tool that uses the second operating system, wherein the second scheduler tool manages at least one function of the second data integration system; and
the media is further operable when executed to perform operations comprising:
determining an additional plurality of differences between the first scheduler tool and the second scheduler tool;
determining an additional set of transformation rules, based at least in part on at least one of the additional plurality of differences;
creating an additional conversion algorithm, based at least in part on the additional set of transformation rules;
executing the additional conversion algorithm to convert a file associated with the first scheduler tool to a file associated with the second scheduler tool; and
executing the second scheduler tool, wherein the second scheduler tool uses the second at least one file.

14. A method, comprising:
identifying a first data integration system that uses a first operating system;
identifying a first file format associated with data for the first data integration system, wherein the first file format is specific to the first operating system;
identifying a second data integration system that that uses a second operating system, wherein the first operating system is different than the second operating system;
identifying a second file format associated with data for the second data integration system, wherein the second file format is specific to the second operating system;
determining, by a processor, a plurality of differences between the first data integration system and the second data integration system, wherein the plurality of differences comprises:
format difference between the first file format and the second file format; and
operation differences between the first data integration system and the second data integration system;
determining a set of transformation rules, based at least in part on at least one of the plurality of differences, wherein the set of transformation rules describe how to convert data from the first file format to the second file format;
creating, by the processor, a conversion algorithm, based at least in part on the set of transformation rules;
executing the conversion algorithm to convert a set of files associated with the first data integration system to a corresponding set of files associated with the second data integration system wherein converting the set of files associated with the first data integration system comprises:
parsing the set of files associated with the first data integration system into a plurality of source tokens;
identifying source tokens from among the plurality of source tokens to convert to a target token;
converting the identified source tokens into target tokens;
sending the target tokens to a post-conversion file;
sending source tokens from among the plurality of source files that were not converted to target tokens to the post-conversion file; and
assembling the file associated with the second data integration system using source tokens and target tokens in the post-conversion file; and
executing the second data integration system, wherein the second data integration system uses at least one of the converted files associated with the second data integration system.

15. The method of claim 14, wherein the plurality of differences are determined, based least in part, on an additional plurality of differences between:
a first set of tokens associated with the first data integration system; and
a second set of tokens associated with the second data integration system.

16. The method of claim 14, wherein:
the file associated with the first data integration system comprises a first set of multiple files, wherein the first set of multiple files comprises at least one of a .dsx and a .bat file associated with a first data integration application, wherein the first data integration application comprises instructions for executing at least one function of the first data integration system; and the file associated with the second data integration system comprises a second set of multiple files, wherein the second set of multiple files comprises at least one of a .dsx, a .sh, and .ksh file associated with a second data integration application, wherein the second data integration application comprises instructions for executing at least one function of the second data integration system.

17. The method of claim 16, wherein:

the first operating system is a version of a Windows operating system;

the second operating system is a version of a Linux operating system;

the first data integration application is a first version of DataStage; and the second data integration application is a second version of DataStage.

18. The method of claim 14, wherein:

the first data integration system comprises a first scheduler tool, wherein the first scheduler tool manages at least one function of a third data integration system; and the second data integration system comprises a second scheduler tool, wherein the second scheduler tool manages at least one function of a fourth data integration system.

19. The method of claim 14, wherein:

the first data integration system further comprises a first scheduler tool that uses the first operating system, wherein the first scheduler tool manages at least one function of the first data integration system;

the second data integration system further comprises a second scheduler tool that uses the second operating system, wherein the second scheduler tool manages at least one function of the second data integration system; and the method further comprises:

determining an additional plurality of differences between the first scheduler tool and the second scheduler tool;

determining an additional set of transformation rules, based at least in part on at least one of the additional plurality of differences;

creating an additional conversion algorithm, based at least in part on the additional set of transformation rules;

executing the additional conversion algorithm to convert a file associated with the first scheduler tool to a file associated with the second scheduler tool; and executing the second scheduler tool, wherein the second scheduler tool uses the second at least one file.

20. The method of claim 19, wherein:

the file associated with the first scheduler tool is a .jil file associated with a first scheduler application; and the file associated with the second scheduler tool is a .jil file associated with a second scheduler application.

* * * * *